United States Patent

[11] 3,597,975

[72] Inventors David W. Kern
 Slatedale;
 Philip D. Stelts, Center Valley, both of, Pa.
[21] Appl. No. 753,187
[22] Filed Aug. 16, 1968
[45] Patented Aug. 10, 1971
[73] Assignee Bethlehem Steel Corporation

[54] APPARATUS FOR INTRODUCING A DROP-IN THERMOCOUPLE INTO A BASIC OXYGEN FURNACE
 3 Claims, 5 Drawing Figs.
[52] U.S. Cl. .................................................. 73/343,
 73/359
[51] Int. Cl. .......................................... G01k 1/08
[50] Field of Search............................................ 73/341,
 343, 359; 221/289

[56] References Cited
UNITED STATES PATENTS
3,390,578 7/1968 Moore.......................... 73/359
3,396,580 8/1968 Cole............................. 73/359 X
Primary Examiner—Stanley H. Tollberg
Attorney—Joseph J. O'Keefe ABSTRACT: An apparatus for introducing a drop-in thermocouple into a molten ferrous bath in a basic oxygen furnace, said apparatus includes a combination closed-compartmentized holding box and charging chute. Each compartment of the box is provided with a restraining means, anchoring means, means for introducing a coolant gas therein and means for electrically connecting the thermocouple cable to an outside recording device. The charging chute includes a wide holding portion whose sides converge to form a restricted funnellike charging portion by which the thermocouple is guided downwardly into the furnace.

Patented Aug. 10, 1971
3,597,975
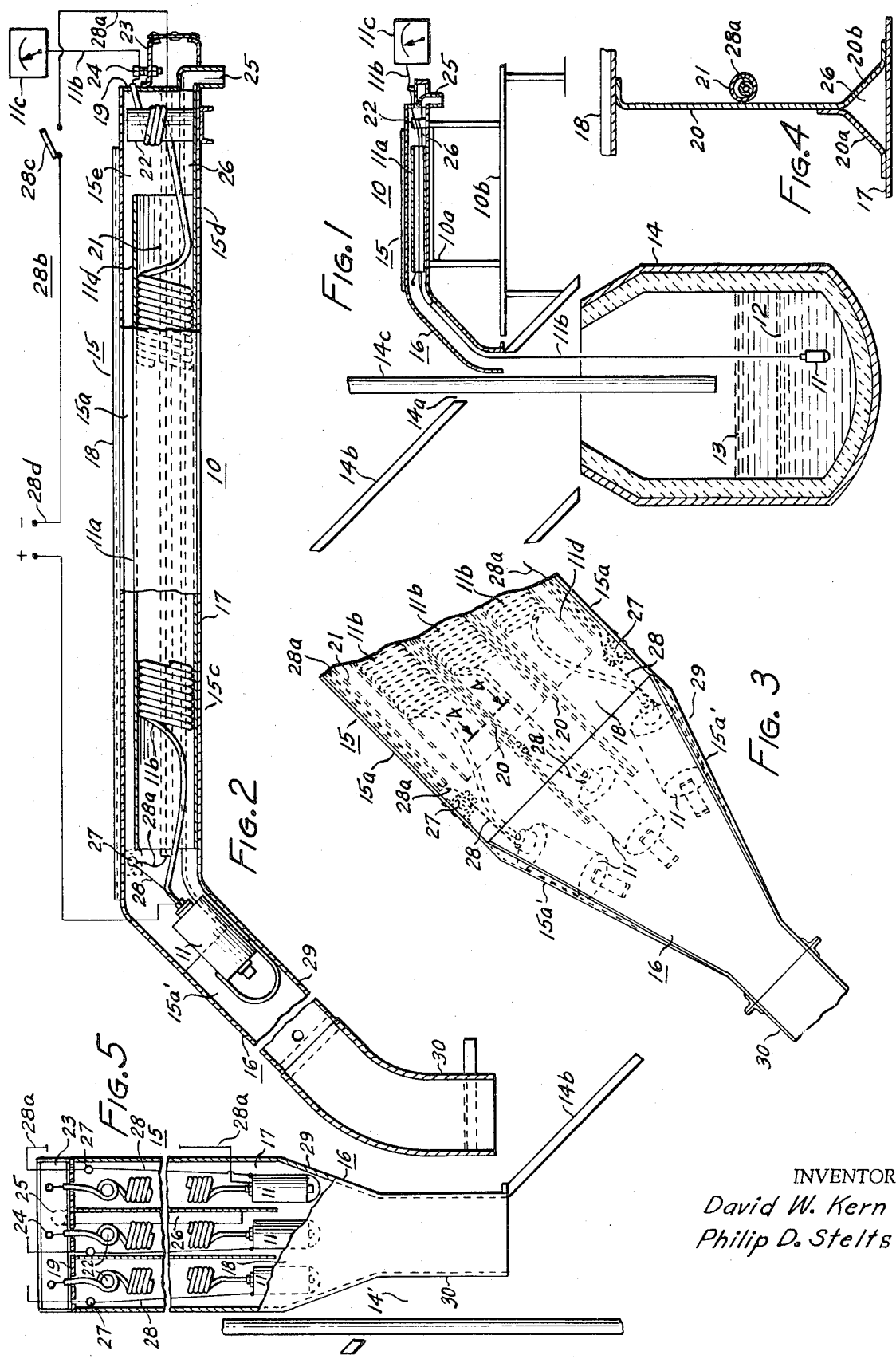
INVENTORS
David W. Kern
Philip D. Stelts 3,597,975

APPARATUS FOR INTRODUCING A DROP-IN THERMOCOUPLE INTO A BASIC OXYGEN FURNACE

BACKGROUND OF THE INVENTION

In the refining of molten iron and scrap into steel by the basic oxygen process, it is necessary for the operator to know the temperature of the molten bath near the end of the refining period. Apparatus has been developed whereby an immersion-type thermocouple may be lowered into the molten bath or by which a thermocouple may be dropped from a height into the molten bath. However, charging of a drop-in thermocouple is extremely hazardous because of the hostile environment from which it must be charged. The hot and dusty hostile environment makes it extremely difficult to charge the thermocouples by present-day apparatus.

It is therefore the object of this invention to provide apparatus for charging a drop-in thermocouple into a basic oxygen furnace which is safe and reliable.

SUMMARY OF THE INVENTION

Broadly, the apparatus of the invention includes a combination closed compartmentalized holding box and an inclined charging chute. Each compartment of the box contains a restraining means to prevent premature entry of a drop-in thermocouple into a basic oxygen furnace, an anchoring means, means for electrically connecting a thermocouple cable to a recording device and means for allowing the entrance of cooling gas into the compartments of the box. The closed inclined chute has a holding portion and a downwardly directed funnellike charging portion whereby a drop-in thermocouple may be guided into the furnace.

BRIEF DESCRIPTION OF THE DRAWINGS

FIG. 1 is a cross-sectional view showing the relationship between a basic oxygen furnace and the apparatus of the invention with a drop-in thermocouple in the molten ferrous bath in the furnace.

FIG. 2 is a view in sectional elevation of the apparatus of the invention.

FIG. 3 is a top view of the inclined chute portion of the apparatus.

FIG. 4 is a sectional view on the line 4—4 of FIG. 3 showing one of the dividing ribs in the box.

FIG. 5 shows another embodiment of the invention.

DESCRIPTION OF THE PREFERRED EMBODIMENTS

Referring now to the drawings, FIG. 1 shows a drop-in thermocouple 11 in a molten ferrous bath 12 having a slag cover 13 thereon in a basic oxygen furnace 14 after it has been released from the apparatus 10 of the invention. The apparatus 10 includes a combination closed compartmentalized holding box 15 in which a plurality of drop-in thermocouple assemblies 11a are placed, and a downwardly extending inclined chute 16. A drop-in thermocouple assembly comprises the thermocouple 11, a packing tube 11d and a multiple wire cable 11b. The apparatus 10 is supported by any suitable means 10a, for example, a metal superstructure on the service floor 10b of the basic oxygen furnace shop. Multiple wire cable 11b connects the thermocouple to an outside recording device 11c. The inclined chute 16 extends downwardly to the lance opening 14a in the exhaust hood 14b through which an oxygen lance 14c is lowered into the furnace 14.

The apparatus of the invention is shown in detail in FIG. 2. The apparatus is basically a combined closed compartmentalized box 15 generally rectangular in cross section having a forward portion 15c and a rear portion 15d and a charging chute 16 extending forwardly and downwardly from 15c.

The closed compartmentalized box 15 has two vertical-parallel-longitudinal sidewalls 15a, a base 17, a cover 18 parallel to the base 17 and a rear wall 19. The cover 18 is pivotally attached by suitable means, for example, a piano hinge, not shown, to one of the sidewalls 15a. The box 15 is divided into a plurality of compartments by means of a plurality of parallel longitudinal interior ribs 20 extending substantially the length of the box 15. Since each compartment is basically the same only one compartment will be described. Attached to the rib 20 and spaced above the base 17 is a conduit 21 which extends the length of the rib 20. An anchor post 22 is provided in the rear portion 15d of the box 15 around which the cable 11b may be cinched. Extending outwardly from the rear wall 19 of the box 15 is a bracket 23 to which a first binding post 24 is attached. The wires in the cable 11b are attached to the binding post 24. Extending through the lower portion of the rear wall 19 is a gas intake 25 aligned with a gas passage 26 formed by the supporting legs 20a and 20b of the interior vertical rib 20. In the forward portion of the box 15 is a second binding post 27 which may be attached to the upper portion of the sidewall 15a or the vertical rib 20. Extending therefrom are two metallic wires 28 and 28a. The metallic wire 28, which is fusible, is connected to a bracket on the rear portion of a drop-in thermocouple 11 after the thermocouple has been removed from the thermocouple assembly and placed on the charging chute 16. Charging chute 16 includes holding portion 29 and a funnellike charging portion 30. The fusible wire 28 and the second binding post 27 form a means of restraining the thermocouple from premature entry into the furnace. The second wire 28a extends rearwardly from the second binding post 27 through conduit 21 through the rear wall 19 and is connected in series with an electrical switch 28c and power source 28d to form an electrical circuit 28b shown schematically in FIG. 2. When the switch 28c is closed, sufficient current flows in the circuit to generate heat, whereby wire 28 melts releasing the thermocouple 11.

Turning now to FIG. 3, the holding portion 29 of the inclined chute 16 has two sides 15a' which converge to form the funnellike charging portion 30. The holding portion 29 is the same width as the box 15 to make it possible to place a plurality of drop-in thermocouples in position ready for charging. The funnellike charging portion 30 extends vertically downwardly so that a drop-in thermocouple may be guided vertically downwardly into the furnace.

FIG. 4 shows one of the vertical-parallel ribs 20 which divide the box 15 into the compartments. The conduit 21 is attached to the vertical rib 20 and extends the length thereof. The wire 28a connecting the fusible wire 28 electrical switch and power source to form the aforementioned electrical circuit is supported inside the conduit 28a. The gas passage 26 formed by the legs 20a and 20b of the vertical rib 20 and a portion of the base 17 of the box 15 allows a coolant gas to be passed forwardly to the inclined chute 16 and the forward portion 15c of the box 15.

FIG. 5 shows another embodiment of the apparatus of the invention mounted in a vertical position. It is preferred that in this embodiment the compartmentalized box 15 be generally square in cross section. In this embodiment, the base 17 and the cover 18 of the horizontal box 15 now become two fixed opposite parallel sidewalls and the rear wall 19 is made removable to allow positioning of the thermocouple assemblies therein. The bracket 23, first binding posts 24, anchor post 22 and gas intake 25 will be mounted on the rear wall at the rear or upper portion of the compartmentalized holding box 15. The second binding post 27 will also be mounted on the rear wall of the box 15. The fusible wire 28 will extend from the bracket on the rear portion of the thermocouple 11 to the second binding post 27 and the wire 28a will extend outwardly through the rear wall of the box 15. The charging chute consists of a holding portion 29 and a charging portion 30. The drop-in thermocouples will hang freely in the holding portion 29 of the chute 16 in this embodiment. When released, the thermocouples will fall through a hole 14' cut in the exhaust hood 14b into the furnace.

In the use of the apparatus to introduce a drop-in thermocouple into a molten ferrous bath in a basic oxygen furnace to obtain the temperature thereof, a plurality of drop-in thermocouple assemblies are placed in compartments in the holding box. The assemblies are opened and the drop-in thermocouples are placed in the holding portion of the chute. The fusible wire is attached to the bracket of each of the drop-in thermocouples. The wire restrains the thermocouples from premature charging into the furnace. The wire forms one element of an electrical circuit which remains open until a temperature measurement is required. Portions of the thermocouple cables are removed from the rear portion of the assemblies and several turns of each cable are taken around the anchor post to prevent the cable from being pulled into the furnace when the drop-in thermocouple is charged into the furnace. The free ends of the wires in the cable extend through the rear wall of the box and are attached to a binding post to which electrical leads from the recording device have been fastened. After the thermocouples have been prepared for charging, the box is closed and a coolant, for example, air under low pressure is introduced into the box to cool the contents thereof and to prevent ingress of dust and flame.

When a temperature measurement is required, the electrical circuit of which the fusible restraining metallic wire is an element, is closed by the furnace operator at his console. The current which flows in the circuit is sufficient to heat the wire to its melting temperature, thereby releasing one of the drop-in thermocouples. The thermocouple slides down the inclined chute and into the furnace. The anchor post prevents the cable from being pulled into the furnace.

Of course, the excessive heat in the furnace burns through the cable within a short time. However, the cable resists burning a sufficient length of time, for example, about 3 seconds to 6 seconds to obtain a recorded temperature measurement.

The positive gas pressure is kept in the apparatus at all times to keep the inside of the box substantially dust free and at a substantially even temperature. The apparatus of the invention is reliable and reduces the hazards of obtaining temperature measurements to a minimum.

What we claim is:

1. Apparatus for introducing a drop-in thermocouple into a molten ferrous bath in a basic oxygen furnace comprising:
   a. a closed-compartmentized holding box having a forward portion and a rear portion, sidewalls, a cover, a base, a rear wall and a plurality of interior ribs,
   b. a first binding means extending outwardly from said rear wall of said box,
   c. anchor means extending vertically upwardly from said base in said rear portion of said box,
   d. gas entry means in said base in said rear portion of said box, whereby a cooling gas may be introduced into said box to regulate the temperature of the contents therein and to prevent ingress of dust, dirt and flame into said box,
   e. restraining means in said forward portion of said box,
   f. a closed inclined chute extending forwardly and downwardly from said front portion of said box, and
   g. means for releasing said restraining means to permit a thermocouple to drop into the furnace.

2. Apparatus as claimed in claim 1 in which the restraining means of subparagraph (e) includes a metallic fusible wire having one end attached to said thermocouple.

3. Apparatus as claimed in claim 1, in which the means for releasing said restraining means in subparagraph (g) includes an electric circuit formed in part by said metallic fusible wire whereby closing said electric circuit causes said wire to melt and release said thermocouple.